US012026943B2

(12) United States Patent
Park et al.

(10) Patent No.: US 12,026,943 B2
(45) Date of Patent: Jul. 2, 2024

(54) METHOD AND DEVICE FOR DETECTING BOUNDARY OF ROAD IN 3D POINT CLOUD USING CASCADE CLASSIFIER

(71) Applicants: Hyundai Motor Company, Seoul (KR); Kia Corporation, Seoul (KR); Industry-Academic Cooperation Foundation, Yonsei University, Seoul (KR)

(72) Inventors: Jong Won Park, Seongnam-si (KR); Jin Kyu Hwang, Suwon-si (KR); Hyun Ju Kim, Yongin-si (KR); Min Seong Park, Seoul (KR); Won Je Jang, Goyang-si (KR); Eun Tai Kim, Seoul (KR)

(73) Assignees: Hyundai Motor Company, Seoul (KR); Kia Corporation, Seoul (KR); Industry-Academic Cooperation Foundation, Yonsei University, Seoul (KR)

( * ) Notice: Subject to any disclaimer, the term of this patent is extended or adjusted under 35 U.S.C. 154(b) by 435 days.

(21) Appl. No.: 17/644,203

(22) Filed: Dec. 14, 2021

(65) Prior Publication Data

US 2022/0189158 A1 Jun. 16, 2022

(30) Foreign Application Priority Data

Dec. 15, 2020 (KR) .................. 10-2020-0175227

(51) Int. Cl.
*G06K 9/00* (2022.01)
*G01S 17/89* (2020.01)
*G06N 20/10* (2019.01)
*G06V 10/771* (2022.01)
(Continued)

(52) U.S. Cl.
CPC ............ *G06V 20/182* (2022.01); *G01S 17/89* (2013.01); *G06N 20/10* (2019.01); *G06V 10/771* (2022.01); *G06V 20/64* (2022.01)

(58) Field of Classification Search
CPC .... G06V 20/182; G06V 10/771; G06V 20/64; G06V 20/588; G01S 17/89; G01S 7/4808; G01S 17/931; G06N 20/10; G06N 5/04; G06N 20/00; G06F 18/2135;
(Continued)

(56) References Cited

U.S. PATENT DOCUMENTS

| 2016/0180177 A1* | 6/2016 | Nguyen ................. G06V 10/42 |
| | | 382/104 |
| 2017/0248693 A1* | 8/2017 | Kim ...................... G01S 13/865 |

FOREIGN PATENT DOCUMENTS

| CN | 106980871 A | * | 7/2017 | ........... G06F 18/285 |
| CN | 109154993 A | * | 1/2019 | ............ B25J 19/022 |

* cited by examiner

*Primary Examiner* — Xin Jia
(74) *Attorney, Agent, or Firm* — Slater Matsil, LLP (57) ABSTRACT

An embodiment device for detecting a boundary of a road in a 3D point cloud using a cascade classifier includes a rule-based classifier configured to determine whether a received LiDAR cluster has a likelihood of becoming a candidate for the boundary of the road using a box parameter surrounding a point cloud constituting the LiDAR cluster and a point parameter, and a learning-based classifier configured to apply a machine-learning scheme to the LiDAR cluster selected as the candidate for the boundary of the road by the rule-based classifier to determine the LiDAR cluster to be the boundary of the road or an object other than the boundary of the road.

21 Claims, 11 Drawing Sheets

(51) Int. Cl.
*G06V 20/10* (2022.01)
*G06V 20/64* (2022.01)

(58) Field of Classification Search
CPC .... G06F 18/2431; G06F 18/23; G06F 18/241;
G06F 18/24; G06F 18/2148
See application file for complete search history.

Box parameter : $L_{th} = 10\,m,$   $W_{th} = 1.2\,m,$   $H_{th} = 0.5\,m,$
Point parameter : $z_{th} = 1\,m,$   $NP_{th} = 200$

$$C = \begin{bmatrix} \text{cov}(x,x) & \text{cov}(x,y) & \text{cov}(x,z) \\ \text{cov}(y,x) & \text{cov}(y,y) & \text{cov}(y,z) \\ \text{cov}(z,x) & \text{cov}(z,y) & \text{cov}(z,z) \end{bmatrix}$$

Where $\text{cov}(x,y) = \dfrac{\sum_{i=1}^{NP}(x_i-\bar{x})(y_i-\bar{y})}{NP}$

METHOD AND DEVICE FOR DETECTING BOUNDARY OF ROAD IN 3D POINT CLOUD USING CASCADE CLASSIFIER

CROSS-REFERENCE TO RELATED APPLICATIONS

This application claims the benefit of Korean Patent Application No. 10-2020-0175227, filed on Dec. 15, 2020, which application is hereby incorporated herein by reference.

TECHNICAL FIELD

The present invention relates to a method of detecting a boundary of a road using LiDAR information.

BACKGROUND

A light detection and ranging (LiDAR) system is capable of quickly and accurately acquiring a large amount of three-dimensional (3D) spatial coordinate data on a large area and of acquiring data at any time of day or night with reduced likelihood of being affected by weather conditions, unlike aerial photography. Differently from information provided in an image form, it is very difficult to classify and divide LiDAR data, which is an essential process for reproduction of geographic features, due to the uneven distribution of detected points and lack of visual and semantic information. LiDAR technology has also been applied to autonomous vehicles, and object classification technology for perceiving the surroundings of autonomous vehicles has been developed to a high level.

Research on LiDAR technology applied to autonomous vehicles has mainly been focused on the development of a classifier targeted at moving objects, such as vehicles, pedestrians, and two-wheeled vehicles, among objects present on the road. These days, however, technology for classifying static objects on the road is in demand. In particular, technology for classifying boundaries of the road, such as guardrails, which are used as a feature for localization, among static objects, is being increasingly demanded.

Figure 1:
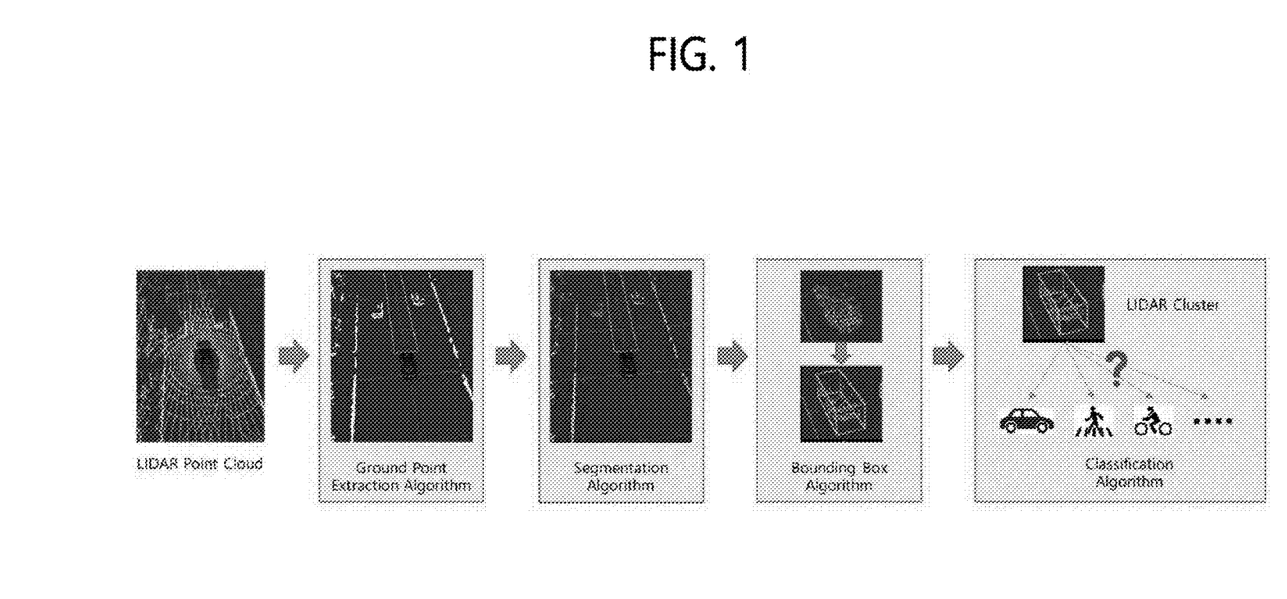
FIG. 1 illustrates LiDAR point cloud processing.

FIG. 1 illustrates LiDAR point cloud processing.

Referring to FIG. 1, a classification algorithm in LiDAR technology is an algorithm that is applied to a LiDAR cluster, which is obtained by applying a ground point extraction algorithm, a segmentation algorithm, and a bounding box algorithm to a LiDAR point cloud, so as to identify the type of object.

Among LiDAR point cloud processing technologies for perceiving the surroundings of autonomous vehicles, object classification technology was disclosed in a paper presented to the IEEE in 2017 (entitled "Real-time object classification for autonomous vehicle using LIDAR", IEEE International Conference on Intelligent Informatics and Biomedical Sciences (ICIIBMS), 2017). The above paper proposes a method of extracting a feature of a LiDAR cluster and designing a classifier using a machine-learning method.

In the case of designing a classifier in a manner of adding a road boundary classification function to the conventional technology, it is difficult to manufacture a highly efficient classifier. The reason for this is that, if a classification function is added to the conventional technology, which substantially uses a machine-learning-based classifier, the complexity of a problem increases, thus making it difficult for the classifier to perform learning.

Figure 2:
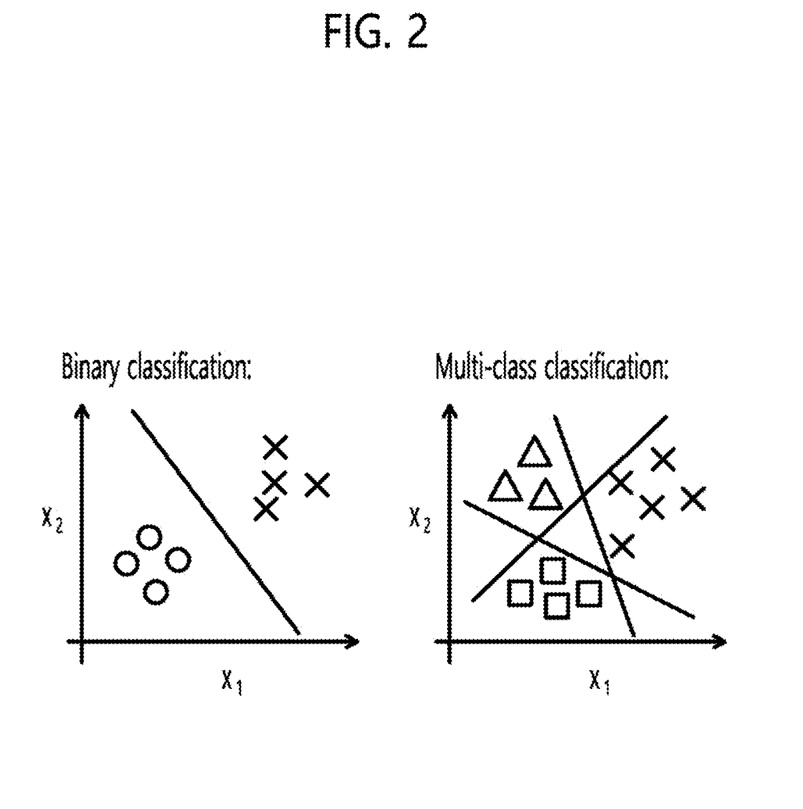
FIG. 2 illustrates an increase in the complexity of a problem according to an increase in the number of classification classes.

FIG. 2 illustrates an increase in the complexity of a problem according to an increase in the number of classification classes.

Referring to FIG. 2, it can be seen that the complexity of a problem is higher in the multi-class classification shown in the drawing on the right than in the binary classification shown in the drawing on the left.

In addition, the feature used in the conventional classifier is designed to satisfy performance requirements suitable for the classification of vehicles, pedestrians, and two-wheeled vehicles, but is not suitable for classification of boundaries of the road. In order to add a road boundary classification function to the conventional functions, it is necessary to add a feature, which incurs a problem of increased computational load.

SUMMARY

The present invention relates to a method of detecting a boundary of a road using LiDAR information. Particular embodiments relate to a method and device for detecting a boundary of a road in a 3D point cloud using a cascade classifier, which is capable of reducing the complexity of a problem due to the simple structure thereof, of being easily combined with conventional technology, of minimizing a computational load, and of maximizing classification performance.

Accordingly, embodiments of the present invention provide a method and device for detecting a boundary of a road in a 3D point cloud using a cascade classifier that can substantially obviate one or more problems due to limitations and disadvantages of the related art.

An embodiment of the present invention provides a method of detecting a boundary of a road in a 3D point cloud using a cascade classifier, which is capable of reducing the complexity of a problem due to the simple structure thereof, of being easily combined with conventional technology, of minimizing a computational load, and of maximizing classification performance.

Another embodiment of the present invention provides a device for detecting a boundary of a road in a 3D point cloud using a cascade classifier, which is capable of reducing the complexity of a problem due to the simple structure thereof, of being easily combined with conventional technology, of minimizing a computational load, and of maximizing classification performance.

However, the embodiments of the present invention are not limited to the above-mentioned embodiments, and other embodiments not mentioned herein will be clearly understood by those skilled in the art from the following description.

An embodiment of the present invention provides a method of detecting a boundary of a road in a 3D point cloud using a cascade classifier, the method including a rule-based classification step and a learning-based classification step. In the rule-based classification step, whether a received LiDAR cluster has a likelihood of becoming a candidate for the boundary of the road is determined using a box parameter surrounding a point cloud constituting the LiDAR cluster and a point parameter. In the learning-based classification step, a machine-learning scheme is applied to a LiDAR cluster selected as the candidate for the boundary of the road in the rule-based classification step in order to determine the LiDAR cluster to be the boundary of the road or an object other than the boundary of the road.

In accordance with another embodiment of the present invention, there is provided a device for detecting a boundary of a road in a 3D point cloud using a cascade classifier, the device including a rule-based classifier and a learning-based classifier. The rule-based classifier determines whether a received LiDAR cluster has a likelihood of becoming a candidate for the boundary of the road using a box parameter surrounding a point cloud constituting the LiDAR cluster and a point parameter. The learning-based classifier applies a machine-learning scheme to a LiDAR cluster selected as the candidate for the boundary of the road by the rule-based classifier in order to determine the LiDAR cluster to be the boundary of the road or an object other than the boundary of the road.

BRIEF DESCRIPTION OF THE DRAWINGS

The accompanying drawings, which are included to provide a further understanding of embodiments of the invention and are incorporated in and constitute a part of this application, illustrate embodiments of the invention and together with the description serve to explain the principle of the invention. In the drawings.

DETAILED DESCRIPTION OF ILLUSTRATIVE EMBODIMENTS

In order to sufficiently understand embodiments of the present invention, operational advantages of embodiments of the present invention, and features accomplished by the implementation of embodiments of the present invention, the accompanying drawings illustrating exemplary embodiments of the present invention and the contents described therein should be referred to.

Hereinafter, preferred embodiments of the present invention will be described in detail with reference to the accompanying drawings. In the drawings, the same or similar elements are denoted by the same reference numerals.

Figure 3:
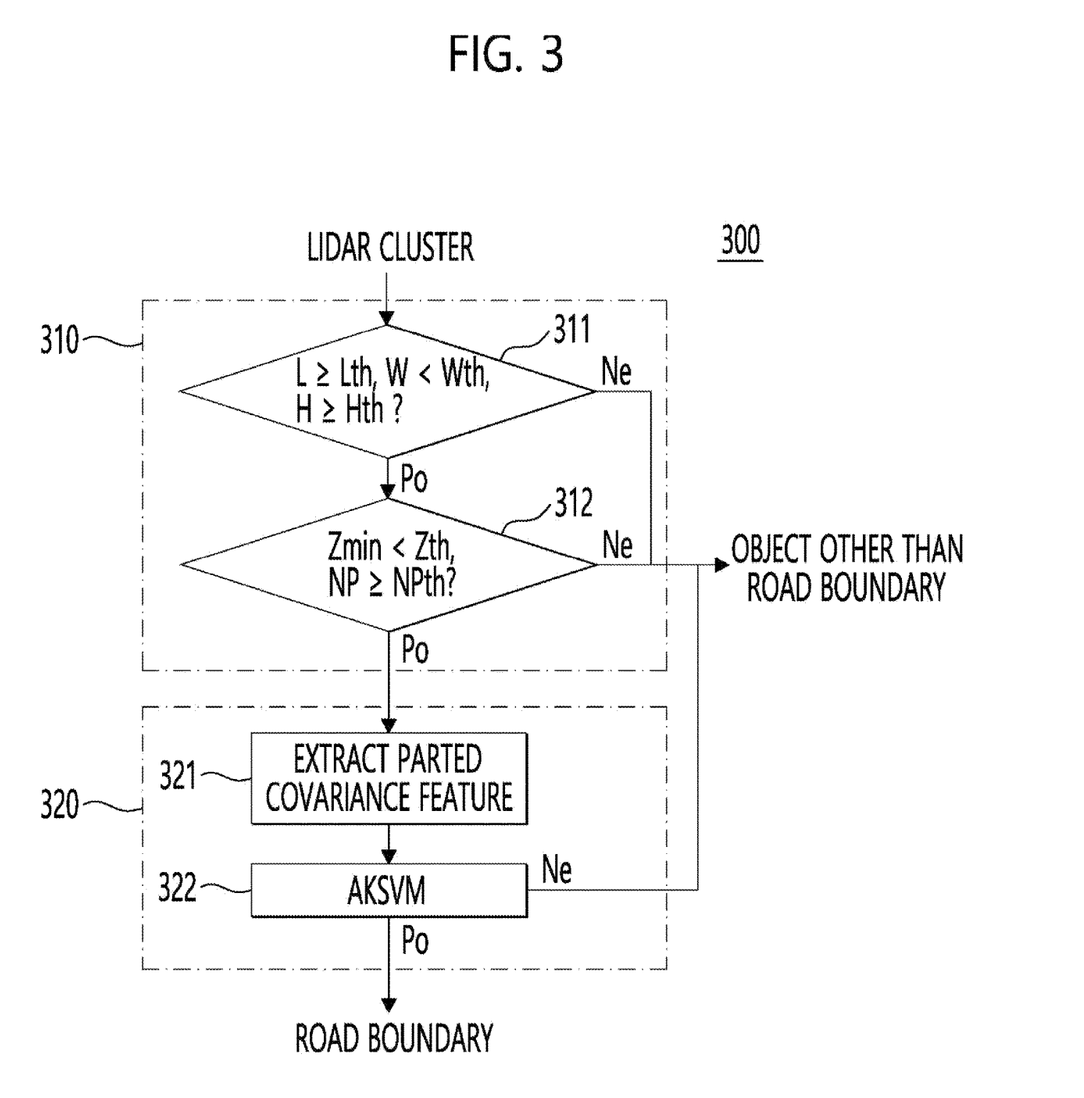
FIG. 3 illustrates a device for detecting a boundary of a road in a 3D point cloud using a cascade classifier according to an embodiment of the present invention.

FIG. 3 illustrates a device for detecting a boundary of a road in a 3D point cloud using a cascade classifier according to an embodiment of the present invention.

Figure 4:
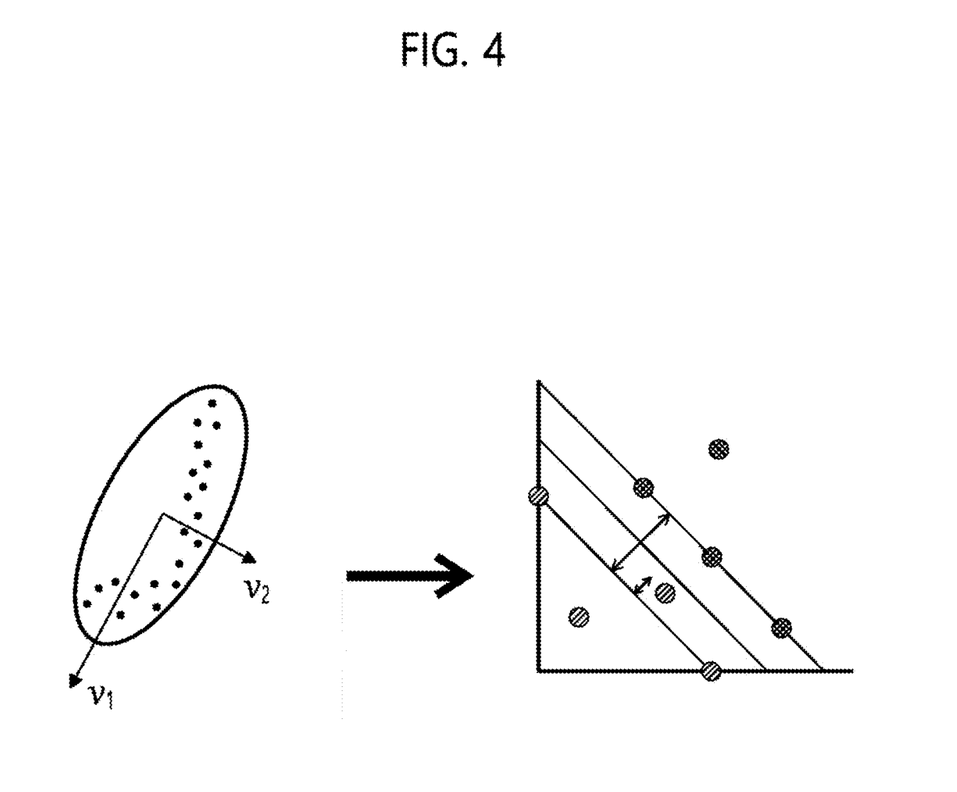
FIG. 4 illustrates a task performed by the learning-based classifier shown in FIG. 3.

FIG. 4 illustrates a task performed by the learning-based classifier shown in FIG. 3.

Referring to FIG. 3, a device 300 for detecting a boundary of a road in a 3D point cloud using a cascade classifier according to an embodiment of the present invention includes a rule-based classifier 310 and a learning-based classifier 320.

The rule-based classifier 310 generates a candidate for the boundary of the road using the superficially revealed feature of a received LiDAR cluster. Here, the superficially revealed feature is information that can be easily perceived, such as the size and shape of a box surrounding a point cloud and the number of points. Embodiments of the present invention propose consecutive implementation of a step using box parameters that are superficially revealed in the LiDAR cluster, i.e., the length L of the cluster, the width W (or area) of the cluster, and the height H of the cluster, and a step using point parameters, i.e., the minimum value Zmin of the heights of the points constituting the cluster and the number NP of points.

The rule-based classifier 310 includes a cluster box parameter comparator 311 and a cluster point parameter comparator 312.

The cluster box parameter comparator 311 compares the length L of the cluster, the width W of the cluster, and the height H of the cluster, which constitute the box parameters of the cluster, with a threshold length Lth, a threshold width Wth, and a threshold height Hth, respectively. If the length L of the cluster is greater than or equal to the threshold length Lth, if the width W of the cluster is less than the threshold width Wth, and if the height H of the cluster is greater than or equal to the threshold height Hth (Positive, hereinafter "Po"), the corresponding cluster is determined to have a likelihood of becoming a candidate for the boundary of the road, and if not (Negative, hereinafter "Ne"), the corresponding cluster is excluded as a candidate for the boundary of the road.

With regard to a cluster that is determined to have a likelihood of becoming a candidate for the boundary of the road as a result of the comparison by the cluster box parameter comparator 311, the cluster point parameter comparator 312 compares the minimum value Zmin of the heights of the points in the cluster and the number NP of points with a threshold minimum value Zth and a threshold number NPth, respectively. If the minimum value Zmin of the heights of the point is less than the threshold minimum value Zth and if the number NP of points in the cluster is greater than or equal to the threshold number NPth (Po), the corresponding cluster is selected as a candidate for the boundary of the road, and if not (Ne), the corresponding cluster is excluded as a candidate for the boundary of the road.

When the cluster box parameter comparator 311 and the cluster point parameter comparator 312 determine that the corresponding cluster is not the boundary of the road (Ne), the conventional classifier (which will be described later) performs an additional determination so as to finally determine the corresponding cluster to be an object other than the boundary of the road.

Figure 5:
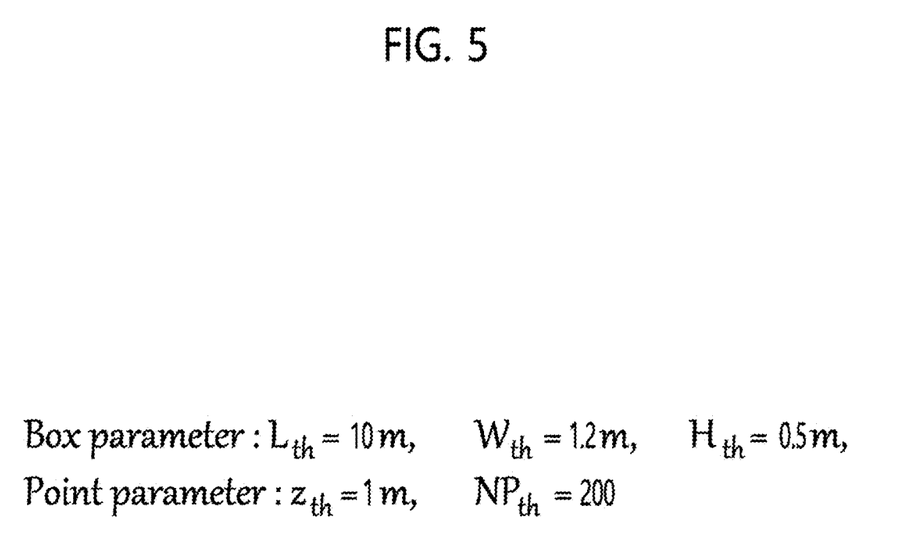
FIG. 5 illustrates examples of threshold values with which box parameters of a cluster and point parameters of the cluster are compared.

FIG. 5 illustrates examples of the threshold values with which the box parameters of the cluster and the point parameters of the cluster are compared.

Referring to FIG. 5, the threshold length Lth is set to 10 meters (m), the threshold width Wth is set to 1.2 m, the threshold height Hth is set to 0.5 m, the threshold minimum value Zth is set to 1 m, and the threshold number NPth is set to 200.

Figure 6:
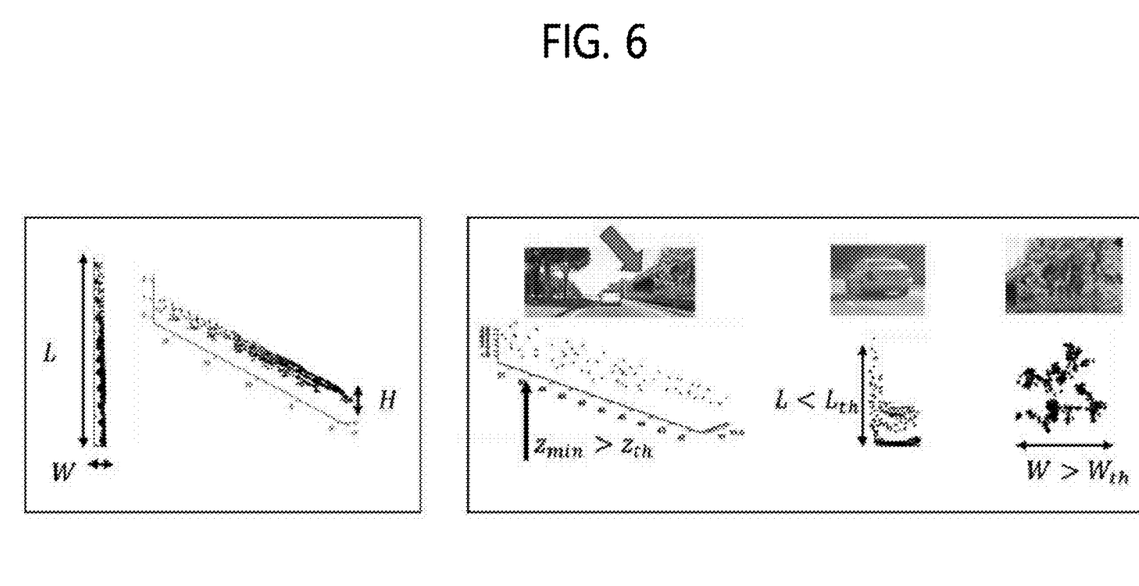
FIG. 6 illustrates a result of a determination performed on the cluster by a rule-based classifier.

FIG. 6 illustrates a result of a determination performed on the cluster by the rule-based classifier.

The drawing on the left in FIG. 6 shows a cluster determined to be a candidate for the boundary of the road by the cluster box parameter comparator 311, and the drawing on the right in FIG. 6 shows a cluster determined not to be a candidate for the boundary of the road by one of the cluster box parameter comparator 311 or the cluster point parameter comparator 312.

When the cluster box parameter comparator 311 and the cluster point parameter comparator 312 exclude the corresponding cluster as a candidate for the boundary of the road, the corresponding cluster is determined to be an object other than the boundary of the road. At this time, the conventional classifier (not shown) performs an additional determination so as to finally determine the corresponding cluster to be an object other than the boundary of the road, which will be described later.

However, even if the corresponding cluster is selected as a candidate for the boundary of the road by the cluster box parameter comparator 311 and the cluster point parameter comparator 312, the corresponding cluster can be finally determined to be the boundary of the road when satisfying the conditions required for tertiary determination performed by the learning-based classifier 320, which will be described below.

The learning-based classifier 320 applies a machine-learning scheme to the candidate for the boundary of the road, which is determined by the rule-based classifier 310, to classify the candidate as the boundary of the road, generates a parted covariance feature required for classification using the point cloud of the cluster, and performs learning for the generated parted covariance feature using an additive kernel support vector machine (AKSVM), which is one of several machine-learning schemes.

The reason why the AKSVM is used is that embodiments of the present invention can reduce the computational load compared to other conventional machine-learning-based classifiers. Due to the reduction in computational load, the rule-based classifier 310 may fall under the category of a weak classifier. Here, the weak classifier is a classifier that does not satisfy the conditions required for classification when used alone, but can function as a classifier capable of minimizing a computational load when used together with another classifier. Therefore, when used alone, the AKSVM may exhibit lower performance than other machine-learning-based classifiers. However, according to the embodiment, the AKSVM is capable of performing learning through the cascade classification structure proposed herein in the state in which learning complexity is reduced. As a result, the computational load is reduced, whereas classification performance is improved.

The learning-based classifier 320 includes a parted covariance feature generator 321 and an AKSVM application unit 322.

Hereinafter, the function of the learning-based classifier 320 will be described with reference to FIGS. 3 and 4.

A feature is created using the point cloud of the cluster. The dimension of the feature is proportional to the computation time of the classifier. Thus, in order to make a classifier capable of minimizing a computational load, it is necessary to use a minimum number of cases and a simple feature. Considering this, embodiments of the present invention provide a parted covariance feature so that classification for the boundary of the road is realized using parted covariance rather than total covariance.

Figure 7:
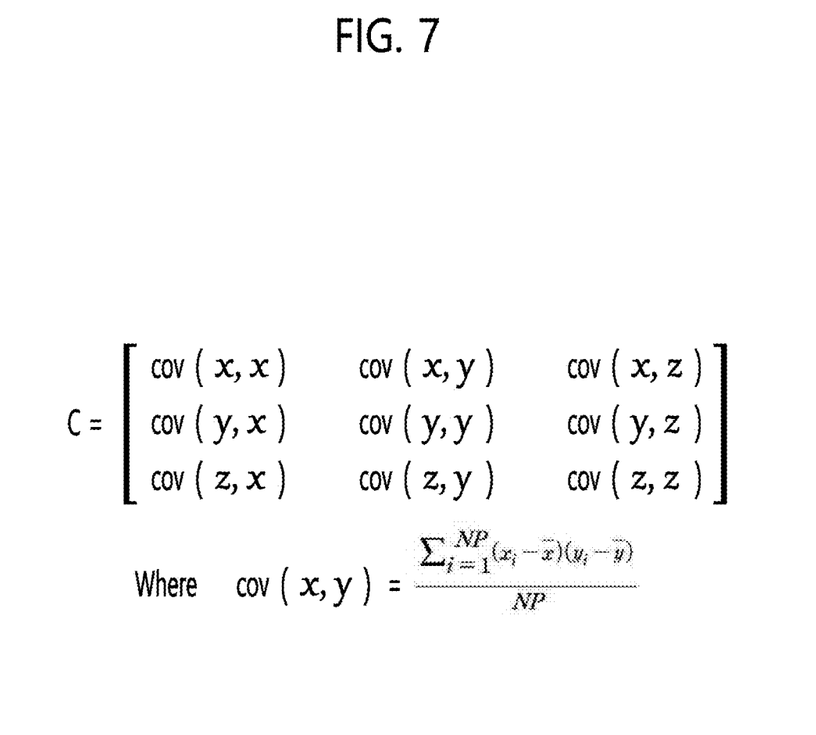
FIG. 7 illustrates an example of a covariance matrix of the point cloud.

Since the LiDAR sensor information is present on three-dimensional xyz coordinates, the same can be expressed in the form of a covariance matrix.

FIG. 7 illustrates an example of a covariance matrix of the point cloud.

An eigenvalue and an eigenvector are calculated through a principal component analysis (PCA) scheme. According to the PCA, the eigenvector v is obtained by analyzing a principal component in the form of a point cloud, and a covariance is calculated based on the principal component. At this time, the covariance corresponding to each eigenvector v becomes the eigenvalue.

It is possible to find out information about the overall shape of the point cloud of the LiDAR cluster through the PCA and the covariance matrix. However, these schemes have a disadvantage in that only the overall shape is expressed, and the detailed shape is not revealed. Considering this, embodiments of the present invention provide a method of dividing a point cloud into spaces using a main-component axis obtained as a result of performing PCA and additionally calculating a covariance in each unit space. In the embodiment, the 3D point cloud is divided into a total of eight spaces using three main-component axes. In this way, it is possible to obtain the overall shape of the point cloud and at the same time to perceive the shape of the part of the point cloud in each of the eight spaces.

In many cases, due to the characteristics of the point cloud, the overall shape of the boundary of the road and the overall shape of a neighboring vehicle are similar to each other. However, it is not possible to accurately distinguish between the boundary of the road and a neighboring vehicle based on the feature created by the conventional method.

The parted covariance feature generator 321 applies the PCA to the point cloud of the cluster to obtain an eigenvector v, divides the point cloud into spaces based on the size of the eigenvalue, and calculates a covariance of the points included in each of the spaces to generate a parted covariance feature.

The AKSVM application unit 322 applies the AKSVM to the parted covariance feature generated by the parted covariance feature generator 321 to determine whether the parted covariance feature is the boundary of the road. When it is determined that the parted covariance feature is the boundary of the road (Po), the corresponding cluster is classified as the boundary of the road, and when it is determined that the parted covariance feature is not the boundary of the road (Ne), the conventional classifier (not shown) performs an additional determination so as to finally determine the corresponding cluster to be an object other than the boundary of the road. This process is the same as the process that is performed by the rule-based classifier 310 described above.

Figure 8:
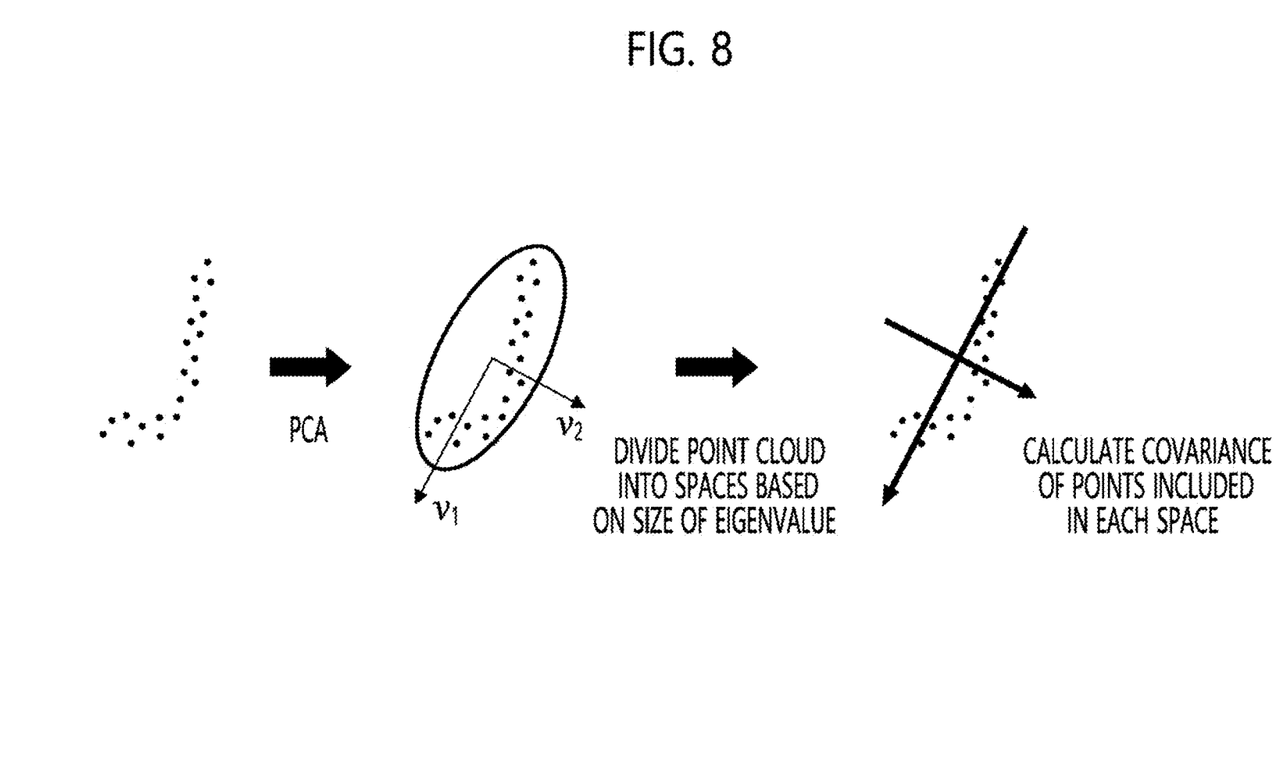
FIG. 8 illustrates a process of generating a parted covariance feature.

FIG. 8 illustrates a process of generating a parted covariance feature.

Referring to FIG. 8, it can be seen that a parted covariance feature is generated in a manner such that the PCA is applied to the point cloud of the cluster to generate an eigenvector v, the point cloud is divided into spaces based on the size of the eigenvalue, and a covariance of the points included in each of the spaces is calculated.

Figure 9:
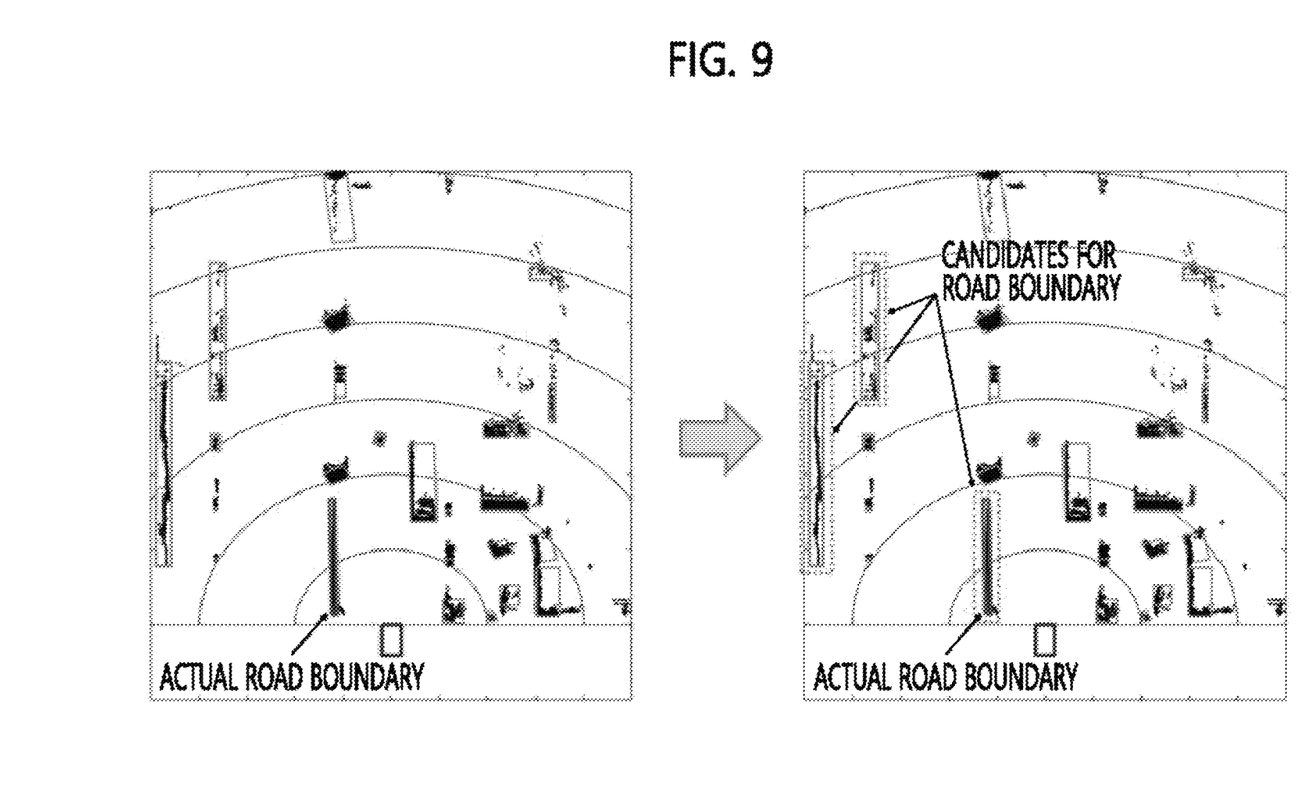
FIG. 9 illustrates a process of generating candidates for a boundary of a road using the rule-based classifier.

FIG. 9 illustrates a process of generating candidates for the boundary of the road using the rule-based classifier.

Referring to FIG. 9, among a large number of LiDAR clusters (the drawing on the left), clusters having shapes similar to that of the boundary of the road are selected as candidates for the boundary of the road through a simple rule (the drawing on the right), whereby the complexity of a problem in the classification process to be performed subsequent thereto is minimized.

Figure 10:
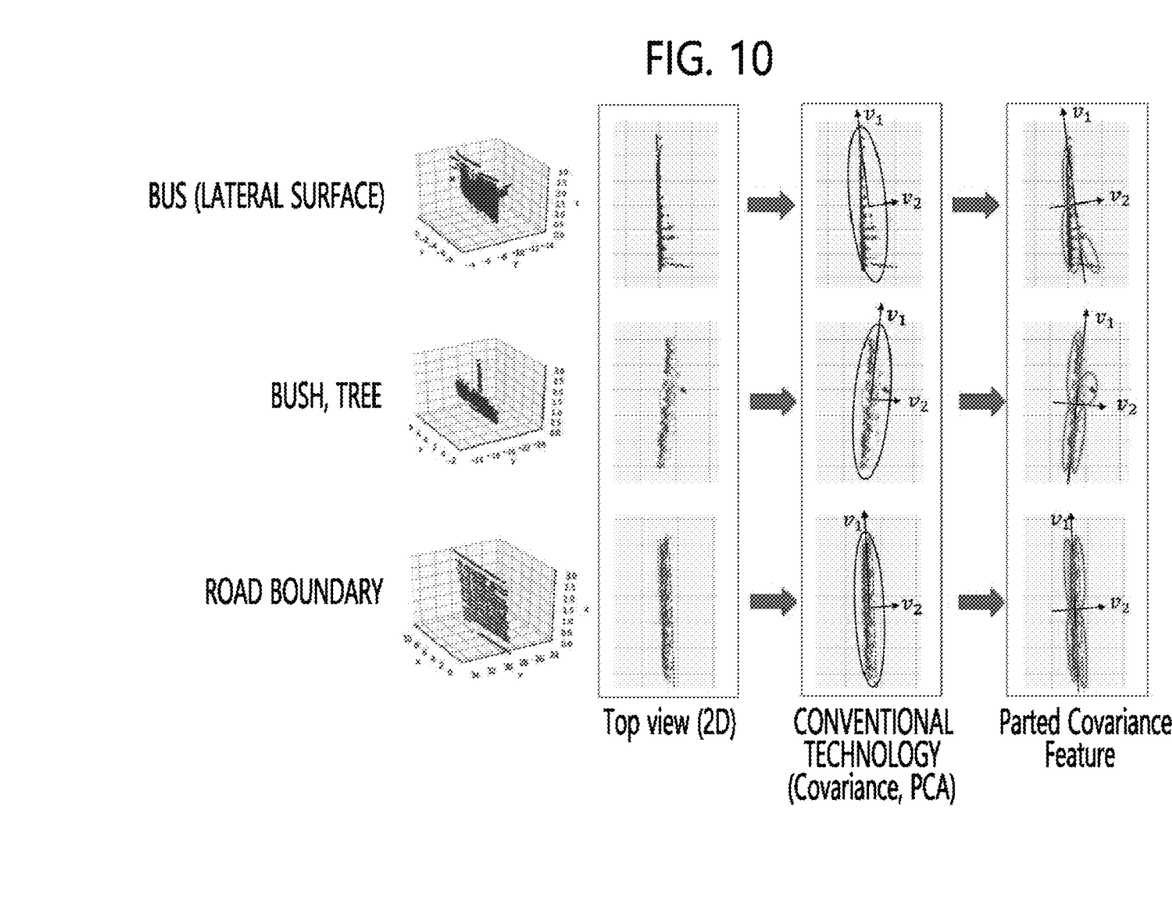
FIG. 10 illustrates an example of applying the parted covariance feature according to embodiments of the present invention and a covariance according to a conventional method to a bus, a bush (a tree), and a boundary of a road.

FIG. 10 illustrates an example of applying the parted covariance feature according to embodiments of the present invention and the covariance according to the conventional method to a bus, a bush (a tree), and a boundary of a road.

In the leftmost drawing in FIG. 10, a lateral surface of a bus and a bush (a tree) are shown as examples of objects that are easily confused with a boundary of the road (a guardrail). Because the shapes of the above objects and the shape of the boundary of the road are very similar to each other in a top view, it is almost impossible to classify the clusters as the boundary of the road, the lateral surface of the bus, and the bush (the tree) using the top view.

Also, the conventional art using only the total covariance and the result of PCA does not express a meaningful difference between the three types of objects, so it can be anticipated that the classification performance thereof is low.

In contrast, as shown in the rightmost drawing in FIG. 10, the parted covariance feature is secured through division of the cluster into spaces, and thus the three types of objects have parted covariance features, the shapes of which are different from each other, as represented by oval lines. The learning-based classifier performs learning based on the features having different shapes from each other, whereby the performance of classifying an object as the boundary of the road is improved.

Figure 11:
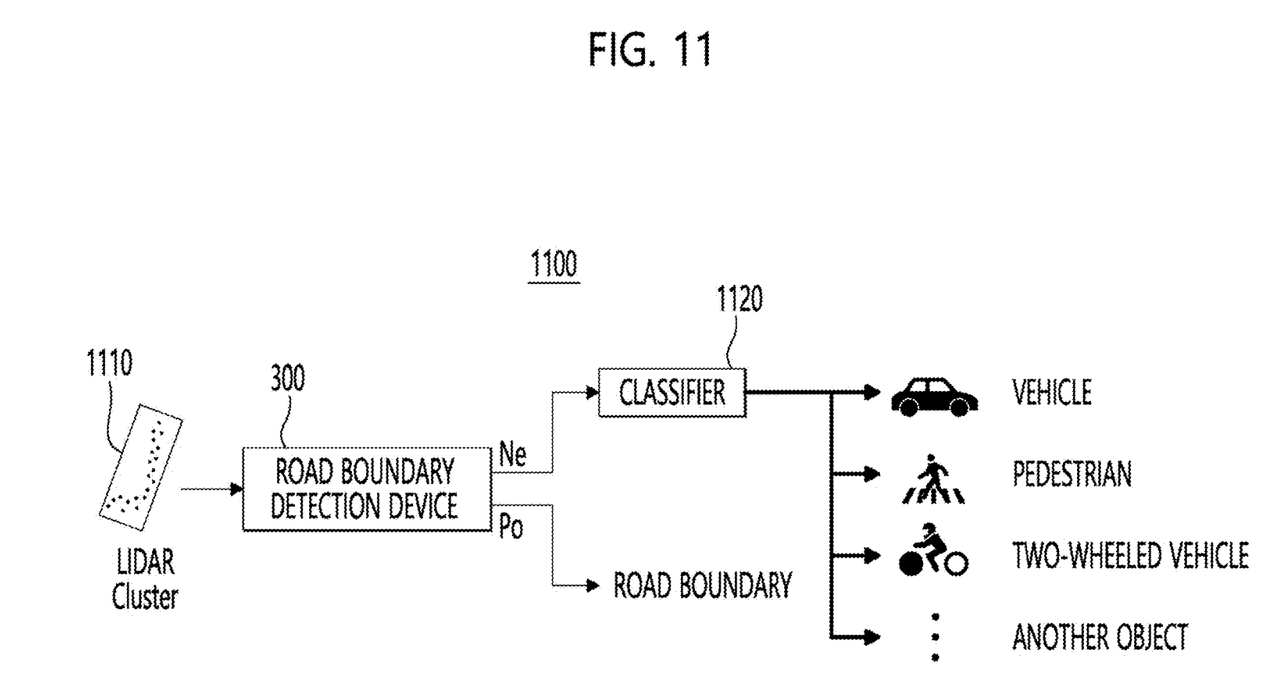
FIG. 11 illustrates a road boundary detection system including the device for detecting a boundary of a road in a 3D point cloud using a cascade classifier according to an embodiment of the present invention.

FIG. 11 illustrates a road boundary detection system including the device for detecting a boundary of a road in a 3D point cloud using a cascade classifier according to an embodiment of the present invention.

Referring to FIG. 11, a road boundary detection system 1100 includes a road boundary detection device 300 of embodiments of the present invention, which classifies a received LiDAR cluster 1110 as a boundary of a road (Po) or an object other than the boundary of the road (Ne), and a conventional classifier 1120, which classifies the object other than the boundary of the road (Ne) as a vehicle, a pedestrian, a two-wheeled vehicle, or another object.

As described above, the road boundary detection device 300 according to embodiments of the present invention determines whether a received LiDAR cluster can become a candidate for a boundary of a road with reduced computational load in order to select the candidate. The conventional classifier 1120 more accurately determines the type of object corresponding to the LiDAR cluster that is determined not to have a likelihood of becoming a candidate for the boundary of the road. Due to combined use with the conventional classifier, it is possible to prevent an increase in the complexity of a problem, which may occur when the number of classification classes increases, and to improve overall performance compared to the case in which a single classifier classifies all classes.

Embodiments of the present invention may be implemented as code that can be written on a non-transitory computer-readable recording medium and thus read by a computer system. The non-transitory computer-readable recording medium includes all kinds of recording devices in which data that may be read by a computer system are stored. Examples of the non-transitory computer-readable recording medium include a Hard Disk Drive (HDD), a Solid-State Disk (SSD), a Silicon Disk Drive (SDD), Read-Only Memory (ROM), Random Access Memory (RAM), Compact Disk ROM (CD-ROM), a magnetic tape, a floppy disc, and an optical data storage.

As is apparent from the above description, according to a method and device for detecting a boundary of a road in a 3D point cloud using a cascade classifier according to embodiments of the present invention, the same is used together with a conventional classifier implementing a conventional classification technology, making it possible to prevent an increase in the complexity of a problem, which may occur when the number of classification classes increases, and to improve overall performance compared to the case in which a single classifier classifies all classes. In addition, since a weak classifier capable of reducing a computational load is used, embodiments of the present invention are suitable for the usage environment of vehicles, in which computation resources are limited.

However, the effects achievable through embodiments of the present invention are not limited to the above-mentioned effects, and other effects not mentioned herein will be clearly understood by those skilled in the art from the above description.

While the present invention has been particularly shown and described with reference to exemplary embodiments thereof, these embodiments are only proposed for illustrative purposes, and do not restrict the present invention. Further, it will be apparent to those skilled in the art that various modifications, additions and substitutions are possible, without departing from the scope and spirit of the invention as disclosed in the accompanying claims.

What is claimed is:

1. A device for detecting a boundary of a road in a 3D point cloud using a cascade classifier, the device comprising:
a rule-based classifier configured to determine whether a received LiDAR cluster has a likelihood of becoming a candidate for the boundary of the road using a box parameter surrounding a point cloud constituting the LiDAR cluster and a point parameter; and
a learning-based classifier configured to apply a machine-learning scheme to the LiDAR cluster selected as the candidate for the boundary of the road by the rule-based classifier to determine the LiDAR cluster to be the boundary of the road or an object other than the boundary of the road.

2. The device according to claim 1, wherein:
the box parameter comprises a length of the cluster, a width of the cluster, and a height of the cluster constituting a box; and
the point parameter comprises a minimum value of heights of points constituting the LiDAR cluster and a number of the points.

3. The device according to claim 2, wherein the rule-based classifier comprises:
a cluster box parameter comparator configured to compare the length of the cluster, the width of the cluster, and the height of the cluster with a predetermined threshold length, a predetermined threshold width, and a predetermined threshold height, respectively, and to select the LiDAR cluster as the candidate for the boundary of the road or to exclude the LiDAR cluster as the candidate for the boundary of the road depending on a result of the comparison; and
a cluster point parameter comparator configured to compare the minimum value of the heights of the points and the number of the points, constituting the LiDAR cluster selected as the candidate for the boundary of the road by the cluster box parameter comparator, with a predetermined threshold minimum value and a predetermined threshold number, respectively, and to select the LiDAR cluster as the candidate for the boundary of the road or to exclude the LiDAR cluster as the candidate for the boundary of the road.

4. The device according to claim 3, wherein the candidate for the boundary of the road selected by the cluster box parameter comparator is the LiDAR cluster satisfying all of:
a first condition that the length of the cluster be greater than or equal to the threshold length;
a second condition that the width of the cluster be less than the threshold width; and
a third condition that the height of the cluster be greater than or equal to the threshold height.

5. The device according to claim 4, wherein the threshold length is 10 m, the threshold width is 1.2 m, and the threshold height is 0.5 m.

6. The device according to claim 3, wherein the candidate for the boundary of the road selected by the cluster point parameter comparator is the LiDAR cluster satisfying all of:
a first condition that the minimum value of the heights of the points be less than the threshold minimum value; and
a second condition that the number of the points in the cluster be greater than or equal to the threshold number.

7. The device according to claim 6, wherein the threshold minimum value is 1 m and the threshold number is 200.

8. The device according to claim 3, wherein the learning-based classifier comprises:
a parted covariance feature generator configured to generate a parted covariance feature with respect to the LiDAR cluster selected as the candidate for the boundary of the road by the rule-based classifier; and
an additive kernel support vector machine (AKSVM) application unit configured to apply an AKSVM to the parted covariance feature generated by the parted covariance feature generator to determine the LiDAR cluster to be the boundary of the road or the object other than the boundary of the road.

9. The device according to claim 8, wherein the parted covariance feature generator is configured to apply a principal component analysis (PCA) scheme to a principal component in a form of the point cloud of the cluster to obtain an eigenvector, calculate a covariance based on the principal component to obtain an eigenvalue, divide the point cloud into spaces based on a size of the eigenvalue, and calculate a covariance of points included in each of the spaces to generate the parted covariance feature corresponding to each of the spaces.

10. A system for detecting the boundary of the road in the 3D point cloud using the cascade classifier, the system comprising:
the device for detecting the boundary of the road in the 3D point cloud using the cascade classifier described in claim 9; and
a classifier configured to classify the LiDAR cluster excluded as the candidate for the boundary of the road by the device for detecting the boundary of the road in the 3D point cloud using the cascade classifier.

11. A method of detecting a boundary of a road in a 3D point cloud using a cascade classifier, the method comprising:
a rule-based classification step of determining whether a received LiDAR cluster has a likelihood of becoming a candidate for the boundary of the road using a box parameter surrounding a point cloud constituting the LiDAR cluster and a point parameter; and
a learning-based classification step of applying a machine-learning scheme to the LiDAR cluster selected as the candidate for the boundary of the road in the rule-based classification step to determine the LiDAR cluster to be the boundary of the road or an object other than the boundary of the road.

12. The method according to claim 11, wherein:
the box parameter comprises a length of the cluster, a width of the cluster, and a height of the cluster constituting a box; and
the point parameter comprises a minimum value of heights of points constituting the LiDAR cluster and a number of the points.

13. The method according to claim 12, wherein the rule-based classification step comprises:
a box-parameter-based comparison step of comparing the length of the cluster, the width of the cluster, and the height of the cluster with a predetermined threshold length, a predetermined threshold width, and a predetermined threshold height, respectively, and selecting the LiDAR cluster as the candidate for the boundary of the road or excluding the LiDAR cluster as the candidate for the boundary of the road depending on a result of the comparison; and
a point-parameter-based comparison step of comparing the minimum value of the heights of the points and the number of the points, constituting the LiDAR cluster selected as the candidate for the boundary of the road in the box-parameter-based comparison step, with a predetermined threshold minimum value and a predetermined threshold number, respectively, and selecting the LiDAR cluster as the candidate for the boundary of the road or excluding the LiDAR cluster as the candidate for the boundary of the road.

14. The method according to claim 13, wherein the candidate for the boundary of the road selected in the box-parameter-based comparison step is the LiDAR cluster satisfying all of:
a first condition that the length of the cluster be greater than or equal to the threshold length;
a second condition that the width of the cluster be less than the threshold width; and
a third condition that the height of the cluster be greater than or equal to the threshold height.

15. The method according to claim 14, wherein the threshold length is 10 m, the threshold width is 1.2 m, and the threshold height is 0.5 m.

16. The method according to claim 13, wherein the candidate for the boundary of the road selected in the point-parameter-based comparison step is the LiDAR cluster satisfying all of:
a first condition that the minimum value of the heights of the points be less than the threshold minimum value; and
a second condition that the number of the points in the cluster be greater than or equal to the threshold number.

17. The method according to claim 16, wherein the threshold minimum value is 1 m and the threshold number is 200.

18. The method according to claim 13, wherein the learning-based classification step comprises:
generating a parted covariance feature with respect to the LiDAR cluster selected as the candidate for the boundary of the road in the rule-based classification step; and
applying an additive kernel support vector machine (AKSVM) to the parted covariance feature to determine the LiDAR cluster to be the boundary of the road or the object other than the boundary of the road.

19. The method according to claim 18, wherein generating the parted covariance feature comprises:

applying a principal component analysis (PCA) scheme to a principal component in a form of the point cloud of the cluster to obtain an eigenvector;

calculating a covariance based on the principal component to obtain an eigenvalue;

dividing the point cloud into spaces based on a size of the eigenvalue; and calculating a covariance of points included in each of the spaces to generate the parted covariance feature corresponding to each of the spaces.

20. The method according to claim 19, further comprising a re-classification step of classifying the LiDAR cluster determined to be the object other than the boundary of the road a vehicle, a pedestrian, a two-wheeled vehicle, or another object.

21. A non-transitory computer-readable recording medium with instructions stored thereon that, when executed by a processor, cause the processor to perform the method of detecting the boundary of the road in the 3D point cloud using the cascade classifier according to claim 20.

* * * * *